(12) United States Patent
Liang

(10) Patent No.: US 8,797,299 B2
(45) Date of Patent: Aug. 5, 2014

(54) STYLUS WITH EXTENDED AND RETRACTED STATES

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 916 days.

(21) Appl. No.: 12/840,453

(22) Filed: Jul. 21, 2010

(65) Prior Publication Data
US 2011/0210948 A1 Sep. 1, 2011

(30) Foreign Application Priority Data

Feb. 26, 2010 (CN) .......................... 2010 1 0114705

(51) Int. Cl.
| | | |
|---|---|---|
| G06F 3/033 | (2013.01) | |
| B41B 1/00 | (2006.01) | |
| G06F 3/041 | (2006.01) | |
| G06K 11/06 | (2006.01) | |
| G08C 21/00 | (2006.01) | |
| B43K 5/16 | (2006.01) | |
| B43K 24/02 | (2006.01) | |
| B43K 7/12 | (2006.01) | |

(52) U.S. Cl.
USPC ........ 345/179; 81/9.2; 178/18.01; 178/19.04; 401/111; 401/114

(58) Field of Classification Search
None
See application file for complete search history.

(56) References Cited

U.S. PATENT DOCUMENTS

| | | | |
|---|---|---|---|
| 6,262,684 B1 * | 7/2001 | Stewart et al. ................. | 343/702 |
| 2006/0055686 A1 * | 3/2006 | Lee ................................ | 345/179 |
| 2009/0122029 A1 * | 5/2009 | Sin ................................ | 345/179 |

FOREIGN PATENT DOCUMENTS

CN 2286454 Y 7/1998

* cited by examiner

Primary Examiner — Alexander S Beck
Assistant Examiner — Kirk Hermann
(74) Attorney, Agent, or Firm — Novak Druce Connolly Bove + Quigg LLP

(57) ABSTRACT

A stylus comprises a stylus barrel, a connecting element and a stylus body. The stylus barrel has a receptacle defined therethrough. The connecting element is fixed to one end of the stylus barrel. The stylus body is retractably and slidably coupled to the stylus barrel. The stylus body is configured to be optionally supported by the connecting element in an extended state or locked to the opposite end of the stylus barrel in a retracted state with the stylus body received within the receptacle of the stylus barrel.

14 Claims, 7 Drawing Sheets

STYLUS WITH EXTENDED AND RETRACTED STATES

CROSS-REFERENCE TO RELATED APPLICATIONS

This application is related to co-pending U.S. patent applications (application Ser. No. 12/840,450 and 12/840,448), entitled "STYLUS", by SHI-XU LIANG. These applications have the same assignee as the present application and have been concurrently filed herewith. The above-identified applications are incorporated herein by reference.

BACKGROUND

1. Technical Field

This exemplary disclosure generally relates to retractable/extendable styluses.

2. Description of Related Art

Portable devices such as smart phones, personal digital assistants (PDA), pagers, personal organizers typically include screens and a display module under the screen. The display module generates target images according to menu options, programs, user choices, and other operations. The device can be controlled by pressing the portions of screen aligned with the target images with a stylus. However, the styluses often have complex structures.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, stylus body-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
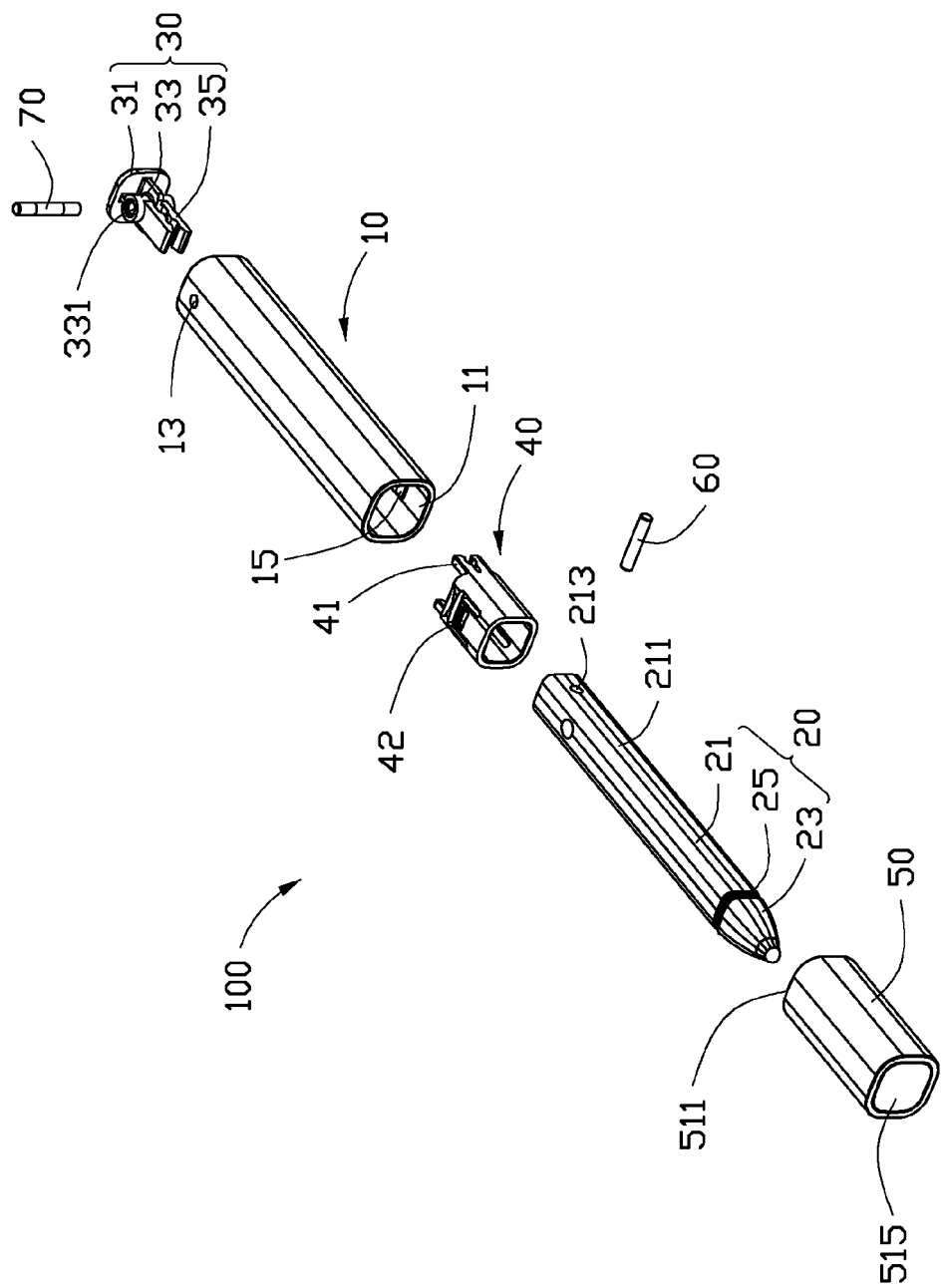
FIG. 1 shows an exploded perspective view of an exemplary stylus.

Referring to FIG. 1, a stylus 100 includes a stylus barrel 10, a stylus body 20, a back cover 30, a connecting element 40, a cap 50 and a latching post 60. The stylus body 20 is retractably and slidably coupled to and partially accommodated within the stylus barrel 10. The back cover 30 is firmly mounted to and accommodated within one end of the stylus barrel 10 by a fixing pole 70. The connecting element 40 is integrally fixed to the other end of the stylus barrel 10 opposite to the back cover 30. The connecting element 40 is configured for optionally latching with the stylus body 20 to support the extended stylus body 20 or enclose the retracted stylus body 20 within the stylus barrel 10. The cap 50 is detachably latched to and covers on the distal end of the stylus body 20 for protecting the stylus body 20 from damage.

The stylus barrel 10 is tubular and manufactured of any suitable materials, and may for example be constructed of a lightweight metal such as stainless steel or aluminum alloy. The stylus barrel 10 is hollow, having a receptacle 11 defined longitudinally therethrough. A fixing hole 13 is defined through one end of the stylus barrel 10 corresponding to the fixing pole 70 and is configured for fixing the back cover 30 to the fixing pole 70. A latching portion 15 is formed at the inner wall of the other end of the stylus barrel 10, opposite to the fixing hole 13. The latching portion 15 is for securely latching the connecting element 40 to the stylus barrel 10. The latching portion 15 includes two latching blocks protruding from the opposite side the inner wall of the stylus barrel 10 adjacent to the other distal end thereof.

The stylus body 20 be manufactured of any suitable materials, and may for example be constructed of a lightweight metal such as stainless steel or aluminum alloy. The stylus body 20 is retractably and slidably received within the receptacle 11 of the stylus barrel 10 and partially extends out of the stylus barrel 10. The stylus body 20 includes a body portion 21, a head portion 23 disposed at one end of the body portion 21 and a latching slot 25 defined between the head portion 23 and body portion 21. The body portion 21 is hollow tubular shaped with a shape and size slightly smaller than that of the receptacle 11 of the stylus barrel 10, so that the body portion 21 can be slidably fitted in the receptacle 11 of the stylus barrel 10. An assembling hole 213 is defined through the other distal end of the body portion 21, away from the head portion 23. The assembling hole 213 corresponds to the latching post 60, and for assembling the stylus body 20 to the stylus barrel 10 by the latching post 60. The latching post 60 passes through the corresponding assembling hole 213 of the stylus body 20, with two ends thereof exposed from the respective two sides of the stylus body 20. The latching post 60 optionally latches to the connecting element 40 for extending the stylus body 20 relative to the stylus barrel 10 or latches to the back cover 30 for retracting the stylus body 20 within the stylus barrel 10. The latching slot 25 is a circular slot recessed from the peripheral of the stylus body 20 and located between the head portion 23 and the body portion 21. The latching slot 25 detachably mounts the cap 50 to the head portion 23.

Figure 2:
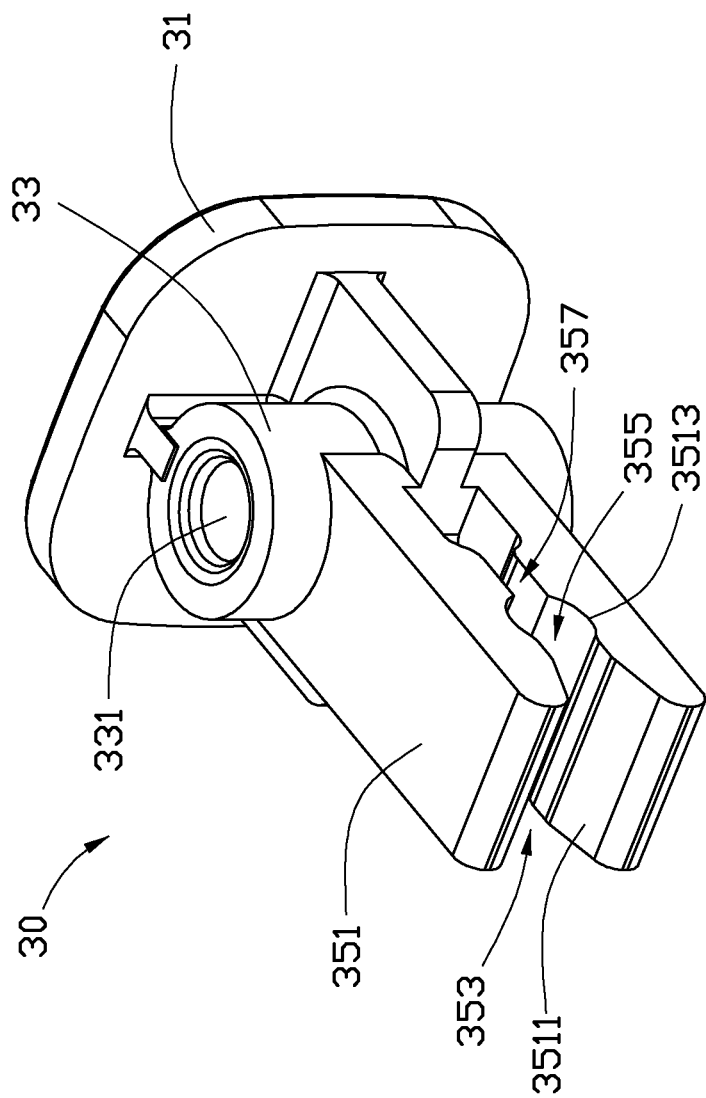
FIG. 2 shows a perspective view of a back cover of the exemplary stylus shown in FIG. 1.
Figure 3:
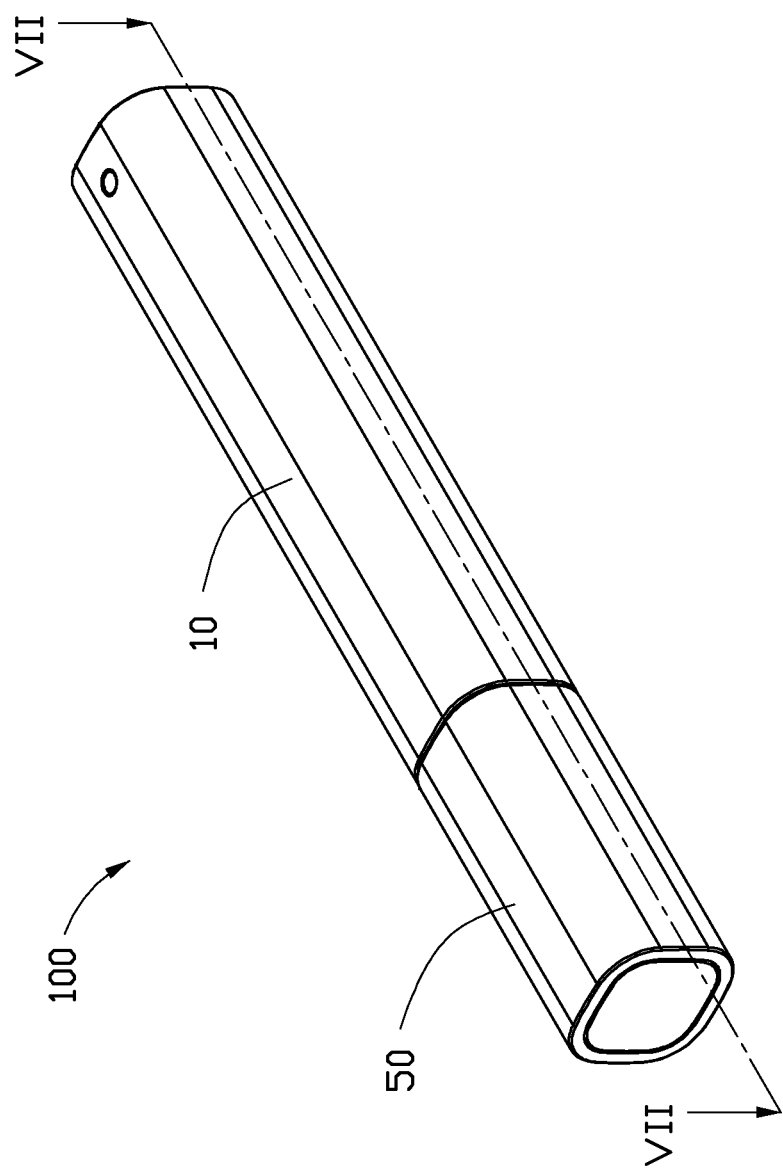
FIG. 3 shows an assembled perspective view of the exemplary stylus shown in FIG. 1, wherein, the stylus is viewed in a retracted or a closed state.
Figure 4:
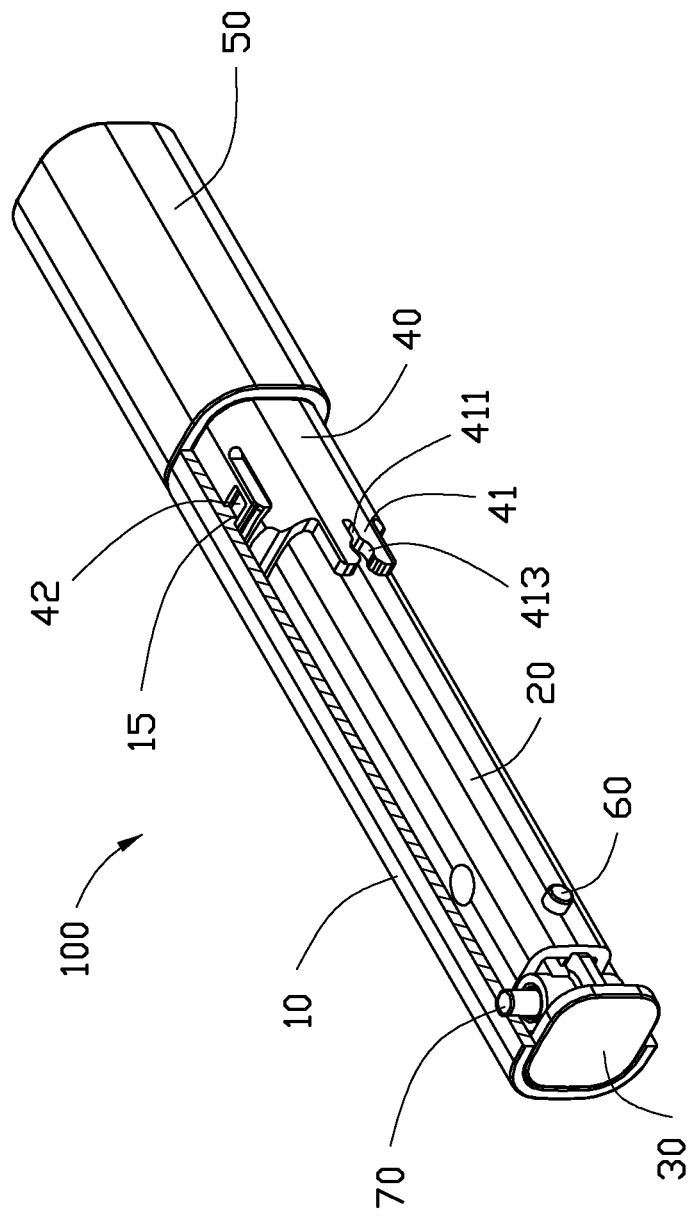
FIG. 4 shows a partial cut-away view of the stylus shown in FIG. 3.

Referring to FIG. 2, the back cover 30 includes a cover body 31, a fixing portion 33 and a clamping portion 35. The cover body 31 has substantially the same shape and size as the receptacle 11 of the stylus barrel 10, such that, the cover body 31 can be covered within one end of the stylus barrel 10. The fixing portion 33 may protrude from the cover body 31 and includes a fastening hole 331 defined therethrough corresponding to the fixing hole 13 of the stylus barrel 10 and the fixing pole 70. The clamping portion 35 is formed on the fixing portion 33 and clamps the stylus body 21 thereto as the stylus body 21 in a retracted state shown in FIG. 4. The clamping portion 35 may be made of elastic material such as plastic, and includes two parallel clamping arms 351 spacingly extending from the fixing portion 33. The distance between the two clamping arms 351 is slightly smaller than the diameter of the latching post 60, thereby defining a clamping space 357 between the two clamping arms 351. The latching post 60 can be tightly clamped between the two clamping arms 351. Each clamping arm 351 forms a guiding portion 3511 at the distal end of an inner surface opposite to the other clamping arm 351, and an arcuate groove 3513 recessed from the middle portion of the inner surface of the clamping arm 351. The two guiding portions 3511 define a guiding trough 353 therebetween, and the two arcuate groove 3513 define a locking space 355 communicating with the guiding trough 353. The two guiding portions 3511 are two sloping surfaces formed adjacent to the distal end of the respective two clamping arms 351, with the distance between the two guiding portions 3511 gradually decreases toward the fixing portion 33 and the locking space 355. The distance between the two conjunctions of the guiding portion 3511 and the arcuate groove 3513 is smaller than the latching post 60. The latching post 60 can be pushed to resist against and passes the two conjunctions of the guiding portion 3511 and the arcuate groove 3513 further into the locking space 355. The shaped and size of the locking space 355 is substantially the same as that of the latching post 60, for receiving the corresponding latching post 60 therein.

Figure 5:
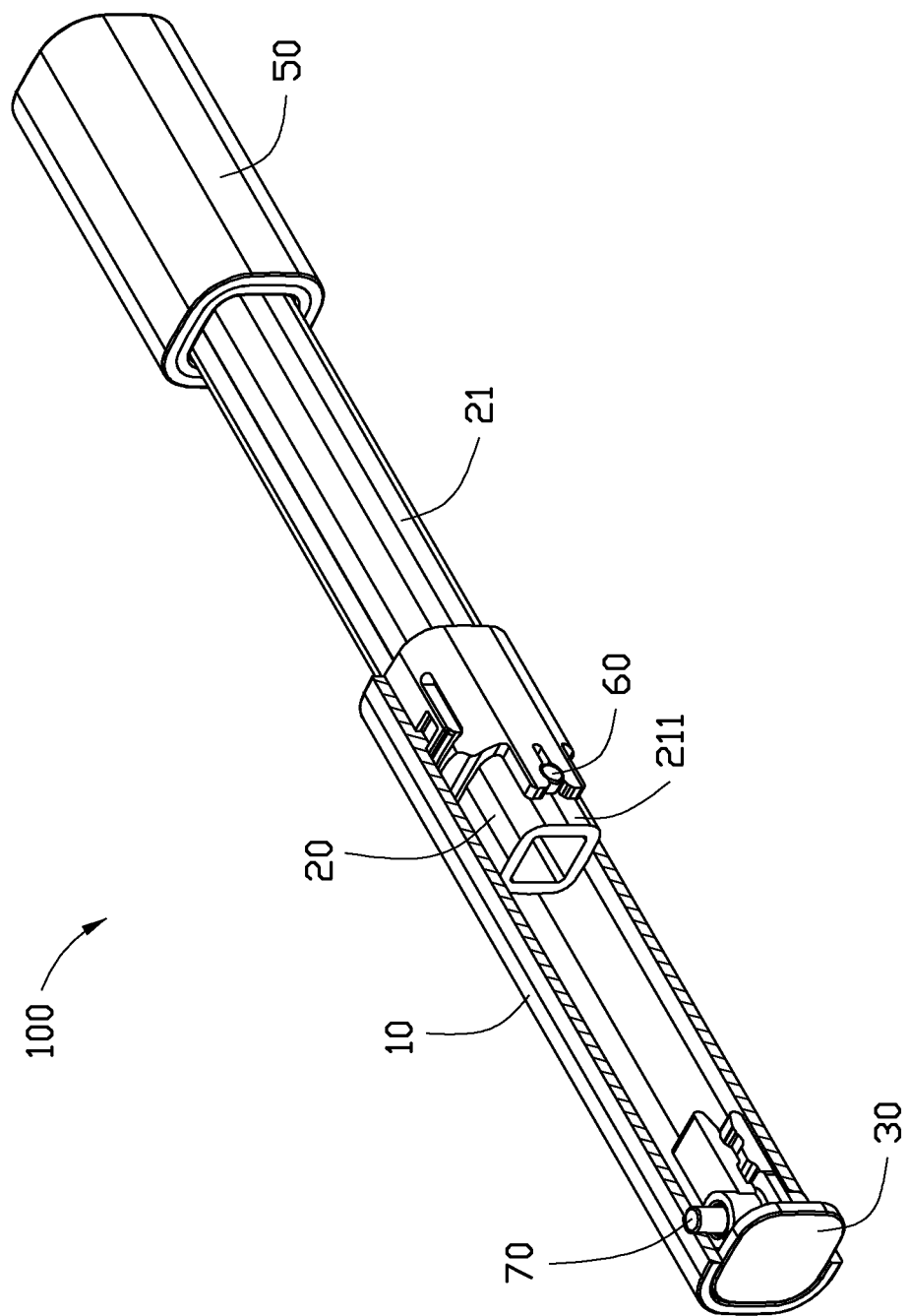
FIG. 5 shows another partial cut-away view of the stylus, wherein, the stylus is viewed in an extended state.

Referring to FIG. 5, the connecting element 40 is secured to the other end of the stylus barrel 10 opposite to the back cover 30 for connecting the stylus body 20 to the stylus barrel 10 and latching with the latching post 60 to support the stylus body 20 in the extended state. The connecting element 40 can be manufactured of any suitable materials, and may for example be constructed of a lightweight metal such as stainless steel or aluminum alloy. The connecting element 40 is hollow tubular shaped with dimensions slightly smaller than that of the receptacle 11 of the stylus barrel 10, so that the connecting element 40 can be received within the other end of receptacle 11 of the stylus barrel 10 opposite to the back cover 30. Two latching arms 41 oppositely extend from two sides of one end of the connecting element 40. Each latching arm 41 has substantially the same structure as that of the clamping portion 35 of the back cover 30. Each latching arm 41 defines a U-shaped opening 411 therethrough for holding and clamping the latching post 60. The width of the opening 411 is slightly smaller than the diameter of the latching post 60, so the latching post 60 can be elastically held within the opening 411. A latching hole 413 is defined through the substantially middle portion of the opening 411 and communicates with the opening 411. The diameter of the latching hole 413 is substantially the same as that of the latching post 60, so that the latching post 60 can be locked and received within latching hole 413 as the stylus body 20 is extended in an extended state shown in FIG. 6. Two latching openings 42 are oppositely defined through the periphery of the connecting element 40 corresponding to the two latching blocks of the latching portion 15 of the stylus barrel 10, so the two latching blocks of the latching portion 15 can respectively latch into the two latching openings 42 of the connecting element 40.

Figure 6:
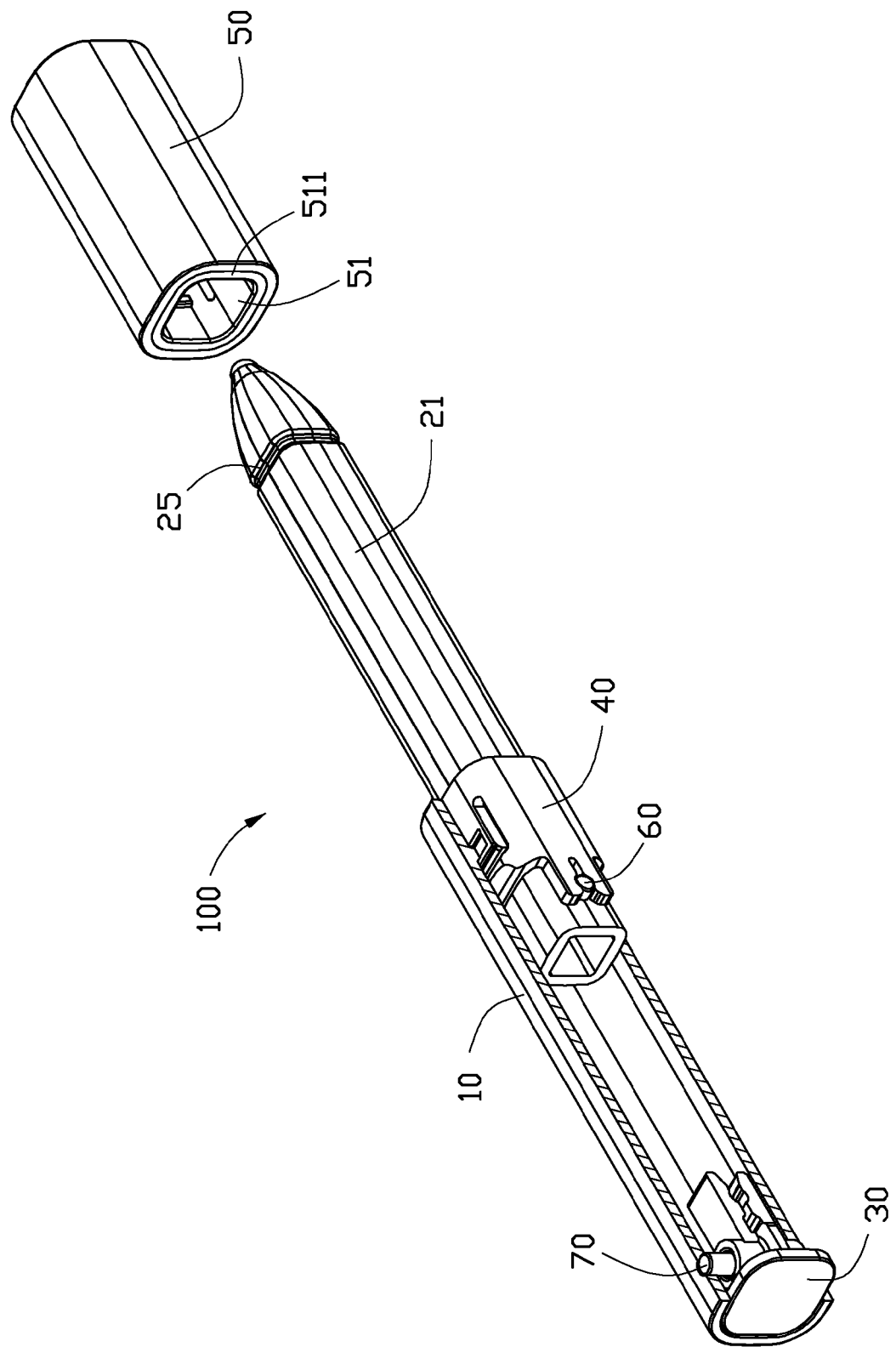
FIG. 6 is similar to FIG. 5, showing the stylus in an extended or open state.
Figure 7:
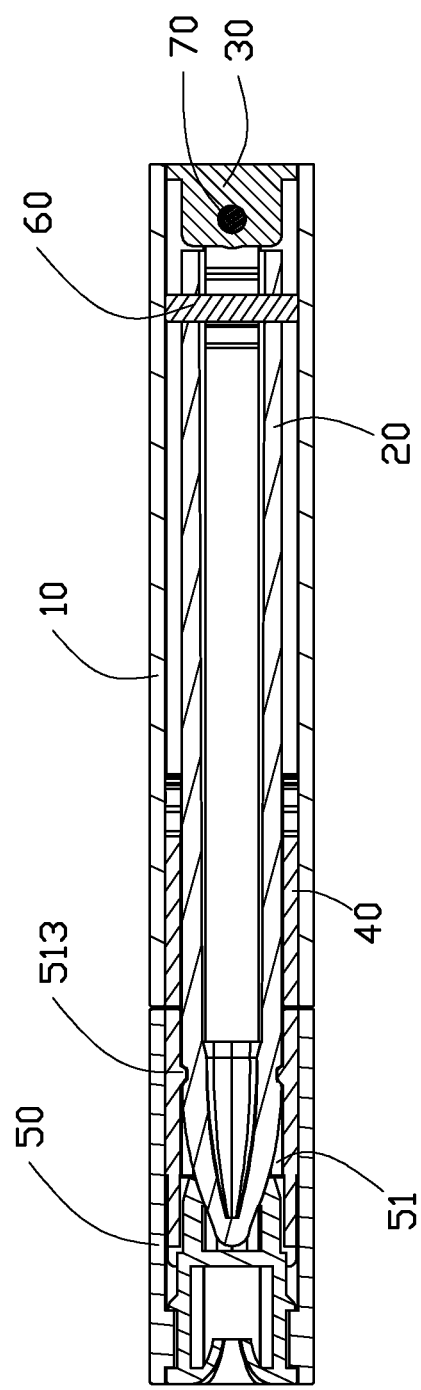
FIG. 7 shows a cross-sectional view taken along line VII-VII of FIG. 3, wherein, the touch stylus is viewed in a retracted or a closed state.

Referring to FIG. 6 and FIG. 7, the cap 50 is substantially hollow cylindrical shaped having substantially the same shape as, but much shorter than that of the stylus barrel 10. The cap 50 includes an accommodating space 51 recessed from one end thereof, thereby forming an opening end 511 and an opposite closed end 513. The accommodating space 51 is configured for receiving the head portion 23 of the stylus body 20 therein. A latching protrusion 513 protrudes from an inner surface of the accommodating space 51 of the cap 50 corresponding to the latching slot 25. The latching protrusion 513 engages with the latching slot 25 when the cap 50 covers to the head portion 23, firmly holding the cap 50 on the head portion 23 of the stylus body 20 to protect the head portion 23.

Referring to FIG. 1, FIG. 5, FIG. 6 and FIG. 7, to assemble the stylus 100, the back cover 30 is inserted in the receptacle 11 of the stylus barrel 10 from the fixing hole 13 end until the fastening hole 331 of the fixing portion 33 aligns with the fixing hole 13 of the stylus barrel 10. The fixing pole 70 is inserted into the fixing hole 13 and the fastening hole 331 with two ends thereof fixed to the stylus barrel 10, thereby securing the back cover 30 to the stylus barrel 10. One end of the stylus body 20, opposite from the head portion 23, passes through the connecting element 40 and aligns with the latching arm 41 end. The latching post 60 penetrates through the assembling hole 213 of the stylus body 20 and secures to the stylus body 20 with two distal ends of the latching post 60 exposing from the respective two sides of the stylus body 20. Then, the connecting element 40 is inserted into the receptacle 11 of the stylus barrel 10 from the other end of the stylus barrel 10 opposite to the back cover 30, and secured to the stylus barrel 10 with the latching portion 15 latching into the corresponding latching opening 42 of the connecting element 40, for coupling the stylus body 20 to the stylus barrel 10. The stylus body 20 is slidably assembled to the stylus barrel 10 and configured to be optionally clamped to the clamping portion 35 of the back cover 30 for a retracted state or latched to the latching hole 413 of the connecting element 50 for an extended state. Finally, the cap 50 covers the head portion 23 of the stylus body 20 with the latching protrusion 513 engaging into the corresponding latching slot 25 of the stylus body 20, to complete assembly of the stylus 100. When the stylus 100 is in a closed state shown in FIG. 7, the stylus body 20 is completely received within the receptacle 11 of the stylus barrel 10, the clamping portion 35 is inserted into the distal end of the body portion 21, the middle portion of the latching post 60 is clamped between the two clamping arms 351 and locked within the locking space 355 of the clamping portion 35 of the back cover 30.

Referring to FIGS. 3-7, when an external force is exerted on the cap 50 away from the stylus barrel 10 to extend the stylus body 20, the stylus body 20 is supported as the two ends of the latching post 60 move into a latched position on the latching arms 41 on the connecting element 40. Next, the cap 50 is pulled away from the stylus barrel 10 as an external force is exerted, and the latching protrusion 513 disengages the latching slot 25 from the stylus body 20, readying the stylus 100 for use.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:
1. A stylus, comprising:
a stylus barrel defining a receptacle;

a connecting element fixed to a first open end of the stylus barrel;
a back cover fixed to a second open end of the stylus barrel;
a latching post; and
a stylus body defining an assembling hole, the latching post passing through the assembling hole, with two ends exposed from opposite sides of the stylus body;
wherein the latching post is detachably latched to the back cover when the stylus body is retracted and received within the receptacle of the stylus barrel in an retracted state; the latching post is detachably latched to the connecting element when the stylus body is slidably extended out of the stylus barrel in an extend state;
wherein the connecting element is hollow tubular shape and fixedly received within the first end of receptacle of the stylus barrel; the connecting element includes two latching arms extending from two opposite sides of one end thereof; the stylus body includes a body portion and the latching post fixed to one end of the body portion; the two ends of the latching post respectively latch to the corresponding two latching arms when the stylus in the extended state.

2. The stylus as claimed in claim 1, wherein each latching arm defines a U-shaped opening therethrough with the width of the opening slightly smaller than the diameter of the latching post; the two latching arms elastically holding and clamping the latching post within the opening thereof.

3. The stylus as claimed in claim 2, wherein the latching arm includes a latching hole defined therethrough and communicating with the opening, such that, the latching post can be locked and received within the latching hole when the stylus body is in the extended state.

4. The stylus as claimed in claim 1, wherein the connecting element further includes two latching openings oppositely defined through the peripheral thereof; the stylus barrel further includes two latching blocks protruding from the opposite sides of the inner wall of the stylus barrel adjacent to the distal end thereof and corresponding to the two latching openings; the two latching blocks respectively latch into the two latching openings of the connecting element.

5. The stylus as claimed in claim 4, wherein the stylus barrel further includes a fixing hole defined through adjacent the other end thereof, the back cover includes a cover body for covering the other end of the stylus barrel and a fixing portion protruding from the cover body; the fixing portion defines a fastening hole therethrough corresponding to the fixing hole; a fixing pole passes through the fixing hole and the fastening hole for securing the back cover to the stylus barrel.

6. The stylus as claimed in claim 5, wherein the back cover further includes a clamping portion having two clamping arms spacingly extending from the fixing portion, thereby defining a clamping space between the two clamping arms; the latching post is tightly clamped between the two clamping arms when the stylus body is in the retracted state.

7. The stylus as claimed in claim 6, wherein each clamping arm includes an arcuate groove recessed from the inner surface thereof opposite to the other clamping arm, such that, the two arcuate grooves together define a locking space; the latching post is locked within the locking space when in the retracted state.

8. The stylus as claimed in claim 7, wherein the stylus body further includes a head portion disposed at the distal end thereof; the stylus further includes a cap detachably latched to and covers on the head portion of the stylus body for protecting the head portion of the stylus body.

9. The stylus as claimed in claim 8, wherein the stylus body further includes a latching slot defined between the head portion and body portion; the cap further includes a latching protrusion protruding from an inner surface of the cap; the latching protrusion engages with the latching slot when the cap covers to the head portion to protect the head portion.

10. A stylus, comprising:
a stylus barrel defining a receptacle therethrough;
a connecting element securely mounted in the receptacle of the stylus barrel, and comprising a holding portion disposed thereon;
a back cover mounted to the stylus barrel and spaced apart from the connecting element, the back cover comprising a clamping portion formed thereon and facing the holding portion;
a stylus body including a latching post and retractably and slidably received in the receptacle of the stylus barrel, the latching post of the stylus body selectively latching with the clamping portion or the holding portion to locate the stylus body in a retracted state or an extended state;
wherein the holding portion includes two latching arms extending from two opposite sides of the connecting element, each latching arm is made of elastic material and defines a U-shaped opening therethrough; the latching post is fixed to the stylus body; the two ends of the latching post are latched into the corresponding two openings of the two latching arms respectively when the stylus is in the extended state.

11. The stylus as claimed in claim 10, wherein the stylus barrel has a connecting end and an opposite locking end; the connecting element is assembled to the connecting end of the stylus barrel and the back cover is mounted to the locking end of the stylus barrel; the stylus body is optionally held by the holding portion of the connecting element when the stylus body is extended relative to the stylus barrel to an extended state, or clamped by the clamping portion of the back cover when the stylus body is retracted relative to the stylus barrel to a closed state.

12. The stylus as claimed in claim 10, wherein the clamping portion includes two clamping arms and a clamping space defined by the two clamping arms; the latching post is tightly clamped between the two clamping arms when the stylus body in the retracted state.

13. The stylus as claimed in claim 12, wherein the stylus body includes a head portion disposed at the distal end thereof; the stylus further includes a cap detachably latched to and covers the head portion of the stylus body for protecting the head portion of the stylus body.

14. The stylus as claimed in claim 13, wherein the stylus body further includes a latching slot defined between the head portion and body portion; the cap further includes a latching protrusion protruding from an inner surface of the cap; the latching protrusion engages with the latching slot when the cap covers to the head portion to protect the head portion.

* * * * *